United States Patent [19]

Woods et al.

[11] 4,185,646

[45] Jan. 29, 1980

[54] CONTROL CIRCUIT FOR MULTI-DENOMINATION CASH DISPENSER

[75] Inventors: Thomas H. Woods, Middletown; Thomas R. Aultz, Cincinnati, both of Ohio

[73] Assignee: TRW Inc., Los Angeles, Calif.

[21] Appl. No.: 824,493

[22] Filed: Aug. 15, 1977

[51] Int. Cl.² .............................................. G07D 1/00
[52] U.S. Cl. ........................... 133/4 R; 194/DIG. 26; 221/93
[58] Field of Search .................. 133/1 R, 2, 4 R, 5 R; 221/9, 13; 194/DIG. 26; 221/93, 94

[56] References Cited

U.S. PATENT DOCUMENTS

| | | | |
|---|---|---|---|
| 3,020,916 | 2/1962 | Buchholz et al. | 133/2 |
| 3,675,816 | 7/1972 | Bourke et al. | 221/13 |
| 3,828,166 | 8/1974 | Johansson et al. | 133/4 R X |
| 3,963,035 | 6/1976 | Levasseur | 133/2 |

Primary Examiner—Joseph J. Rolla
Attorney, Agent, or Firm—Wood, Herron & Evans

[57] ABSTRACT

A control circuit for a multi-denomination cash dispenser in which the number of bills or coins of each denomination, for varying desired quantities of money to be dispensed, are selected such that the total amount of time required to dispense varying quantities of each denomination is minimized. The control circuit of this invention does not necessarily result in dispensing of cash with a minimum number of bills and/or coins. However, it does, in addition to minimizing the cycle time of the cash dispensing operation, equalize the wear on the various individual dispensers; deplete the inventories of different denominations at approximately the same rate, thereby avoiding premature depletion of one denomination relative to the others, and provide the user with a varied mix of denominations regardless of the amount of currency requested.

7 Claims, 1 Drawing Figure

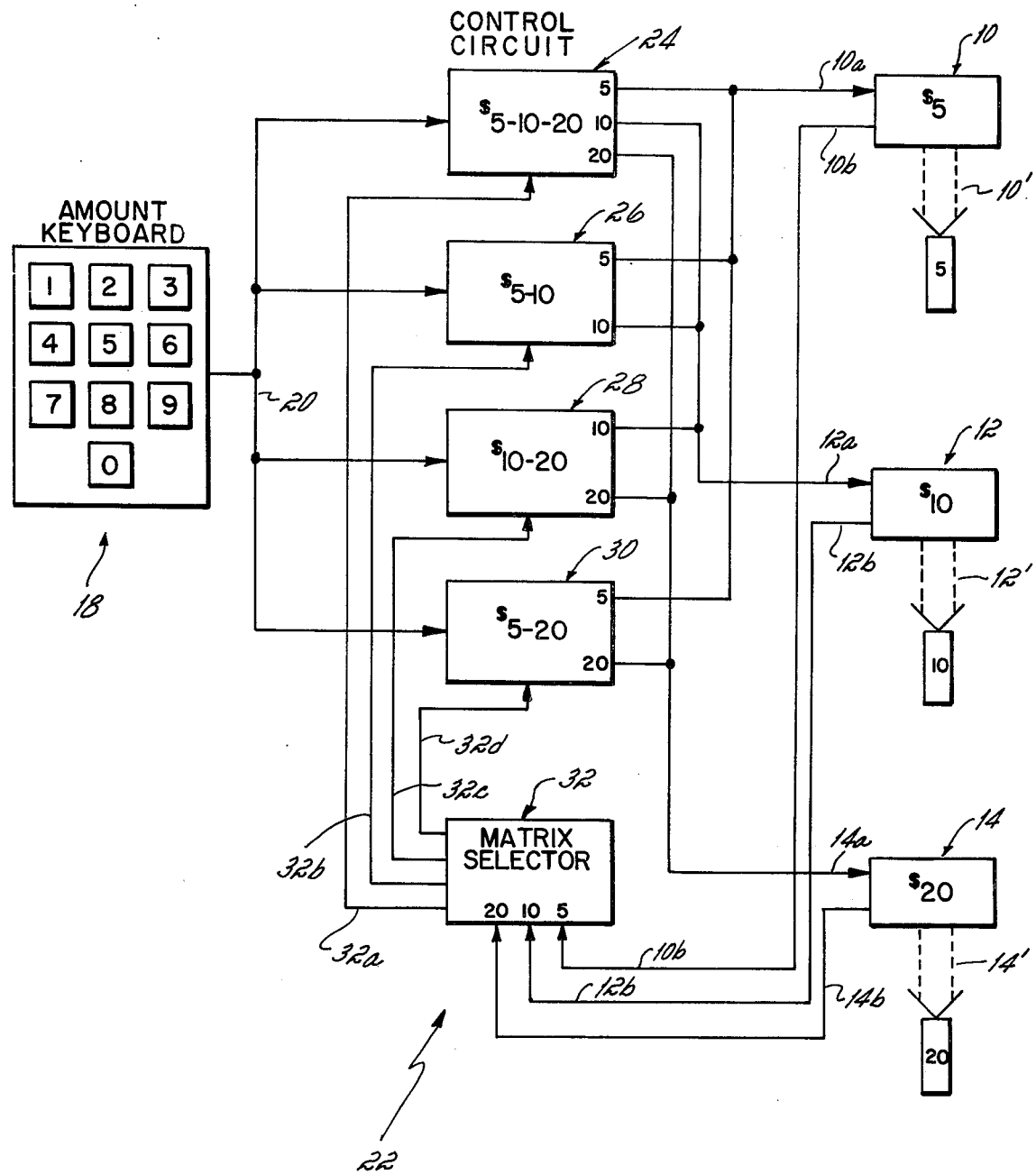

CONTROL CIRCUIT FOR MULTI-DENOMINATION CASH DISPENSER

This invention relates to cash dispensing and more particularly to a control circuit for a multi-denomination cash dispenser.

A multi-denomination automated cash dispenser typically includes an inventory of different denominations, for example, a plurality of stacks of cash of different denominations, a keyboard or other electrical signal command input signal source for entering in the dispenser the aggregate, or total, dollar amount of money to be dispensed, and a control circuit for actuating the various denomination dispensers to effect dispensing of the aggregate amount entered into the keyboard. For example, if the cash dispenser is designed to dispense five, ten and twenty dollar denominations of paper currency, three separate bill dispensers are provided which respectively dispense, independently of the others, five, ten and twenty dollar bills. Also included in such an exemplary system would be a keyboard for entering in the amount to be dispensed such as $65, $80, $110 or like aggregate amounts, as well as a control circuit which in response to keyboard entry of the aggregate amount to be dispensed actuates the various individual currency dispensers as needed to dispense the sum of money which is desired. In the past, it has typically been the practice for the control circuit to dispense the desired aggregate amount entered into the keyboard with the least number of bills. For example, if $80 is desired, and the apparatus has five, ten and twenty dollar dispensers, the machine dispenses four $20 bills.

The prior art approach, wherein the bill mix is designed to dispense the least number of bills, has a number of shortcomings. For example, it has been found that in practice the $20 bill dispenser typically becomes depleted much faster than the other denominations, requiring premature filling of the $20 bill dispenser. In addition, the user is not always provided with a mix of different denomination bills. For example, a user desiring $80 from a machine dispensing fives, tens and twenties would receive four $20 bills and would receive no five dollar bills or ten dollar bills. Another disadvantage of the "minimum bill" mix approach is that the cycle time required to dispense the money is unnecessarily long. For example, if it takes the $20 bill dispenser three seconds to dispense a single $20 bill, a request for $80 would require twelve seconds for completion using the "minimum bill" approach in which four $20 bills are dispensed. By way of contrast, $80 can be dispensed in nine seconds if the $20 bill and $10 bill dispensers, operating simultaneously, issue three $20 bills and two $10 bills, respectively.

Another problem with the "minimum bill" approach, attributable to the relative inequality of use of the different denomination dispensers, is that one of the dispensers tends to become depleted of currency prematurely before the others, the dispenser being depleted prematurely being the denomination which is utilized more frequently than the others. This inequality of use also results in unequal wear of the various dispensers, which in turn gives rise to premature breakdown or failure of the dispenser most frequently used.

It has been an objective of this invention to provide a control circuit for a multi-denomination cash dispenser which obviates the problems of the prior art "minimum bill" mix approach. This objective has been accomplished in accordance with the principles of this invention by providing a control circuit which selects, in response to keyboard entry of the aggregate amount to be dispensed, the mix of bills on the basis of dispensing the desired amount with the minimum overall cycle time. Not only does this speed up the dispensing operation, but it equalizes the rates at which the various denominations become depleted, avoiding premature replenishment of currency inventories. In addition, it equalizes the utilization of the various denomination dispensers resulting in an equalization of wear and avoidance of premature failure. Finally, it provides the user with an assortment of bills in any cash dispensing operation where more than a single bill is dispensed.

In the preferred embodiment of the invention, the operational condition and the supply of currency in each of the different denomination dispensers is monitored. Should one or more of the dispensers become inoperative and/or empty, the control circuit automatically dispenses keyboard-entered monetary amounts with a minimum overall cycle time utilizing those denomination dispensers which are operational and still have a supply of currency therein.

The foregoing objectives, features and advantages of this invention will become more readily apparent from a detailed description hereof taken in conjunction with the drawings in which the single FIGURE is a circuit diagram in block format of a preferred embodiment of the invention.

With reference to the FIGURE, a cash dispensing system incorporating the invention is seen to include a plurality of individual cash dispensers 10, 12 and 14 each of which contain within it a supply of currency of different denominations for dispensing. For example, in a cash dispensing system designed to dispense $5 bills, $10 bills and $20 bills, the cash dispensers 10, 12 and 14 would each contain an inventory or stack of bills of a different denomination, namely $5 bills, $10 bills and $20 bills, respectively. In addition, each of the dispensers 10, 12 and 14 contains an electrical signal responsive mechanism for sequentially dispensing upon receipt of suitable electrical control signals, the bills of its associated stack via a chute or the like, which is indicated schematically by the arrows 10', 12' and 14'. While the cash dispensers 10, 12 and 14 can take any suitable form, a preferred cash dispenser is of the type disclosed and claimed in U.S. Pat. No. 3,795,395 issued Mar. 5, 1974, assigned to the assignee of the present invention. The cash dispensers 10, 12 and 14, in the preferred embodiment, are described as being of the type designed to dispense paper currency. Of course, it is to be understood that the different denomination currency dispensers can be designed to dispense different denominations of coins or a combination of coins and paper currency.

As indicated, each of the cash dispensers 10, 12 and 14 is responsive to electrical control signals for sequentially issuing paper currency. Typically, the control signals are in the form of electrical pulses, with one pulse being input to the dispenser for each bill to be dispensed therefrom. Accordingly, each of the cash dispensers 10, 12 and 14 includes an electrical signal control input line 10a, 12a and 14a for receiving signals for actuating the bill-issuing mechanism of the respective cash dispensers to issue paper currency on command. In addition, each of the currency dispensers 10, 12 and 14, in the preferred embodiment, includes suitable means for monitoring the operability and the inventory level of the dispenser. Output signal lines 10*b*, 12*b* and 14*b*, which are respectively associated with the cash dispensers 10, 12 and 14, are provided on which suitable control signals are output should their respectively associated cash dispenser become inoperative, for example, due to a jam, or totally depleted of currency. The purpose of the control lines 10*b*, 12*b* and 14*b* will become more apparent hereafter.

The cash dispensing system of this invention also preferably includes a keyboard 18 for manual entry of the aggregate, or total, amount of cash to be dispensed. For example, the keyboard 18 may contain the digits 0, 1, . . . 9 for entering the aggregate amount desired, such as $15, $85, $260, or the like. The amount keyboard 18 provides on its output line 20 electrical signals correlated to the total or aggregate amount entered by the keys. The aggregate or total amount of money desired is to be distinguished from entry of the number and denomination of bills which collectively comprise the aggregate or total amount desired. Stated differently, with the keyboard 18 a user desiring $80 merely enters an "8" and a "0", or possibly activates a single key designated "80". In practicing this invention, a user desiring $80 does not enter the denomination of the bills desired, such as "$20", and the number of such bills desired, e.g., four, which collectively provide a total or aggregate amount of $80.

The aggregate, or total, amount entry device 18, in addition to being a keyboard, could conceivably be a card reader or like device which provides on its output line 20 electrical signals correlated to the total or aggregate amount desired by the user.

The cash dispensing system also includes a control circuit 22. Control circuit 22 is responsive to the aggregate or total amount signals on line 20 from the keyboard 18 and the dispenser operability/inventory signals on lines 10*b*, 12*b* and 14*b* from the dispensers 10, 12 and 14, and provides suitable control signals to the dispensers via lines 10*a*, 12*a* and 14*a* for dispensing with a minimal overall cycle time, the aggregate or total amount which is desired.

In one preferred form of the invention, control circuit 22 includes a plurality of matrices 24, 26, 28 and 30 and a matrix selector 32. The matrices 24, 26, 28 and 30 are each input with the aggregate amount signals on line 20 from the keyboard 18 and provide outputs to two or more of the cash dispensers 10, 12 and 14, for controlling the dispensing of different denomination bills from the dispensers in accordance with the desired amount entered into the keyboard 18 and the number and identity of the bill dispensers which are operational and have a supply of bills therein, the dispensing of the desired aggregate amount being accomplished in a minimum cycle time and from those dispensers which are operational and have a supply of bills.

The dispenser 24 is responsive to the aggregate amount signal input from the keyboard 18 on line 20 for providing, when the $5, $10 and $20 bill dispensers are all operational and contain a supply of bills therein, control signals on output line 10*a*, 12*a* and 14*a* to the $5, $10 and $20 bill dispensers 10, 12 and 14 respectively, to dispense, in $5, $10 and $20 bills and in a minimum cycle time, the desired aggregate amount. The maxtrix 26, which is also responsive to the desired amount signals on line 20 from the keyboard 18, provides, when the $5 and $10 bill dispensers 10 and 12 are the only dispensers which are operational and contain a supply of currency, control signals to the $5 and $10 dispensers via lines 10*a* and 12*a* to dispense, in $5 and $10 bills, the desired aggregate amount with a minimum cycle time. The matrix 28 is responsive to the desired amount signals on line 20 from the keyboard 18, and provides, when only the $10 and $20 dispensers 12 and 14 are operational and contain currency, control signals on lines 12*a* and 14*a* to the $10 and $20 dispensers for dispensing in $10 and $20 bills, and with a minimum cycle time, the desired amount entered into the keyboard. Finally, matrix 30, also responsive to desired amounts signals on line 20 from the keyboard 18, provides, when only the $5 and $20 dispensers are operational and have currency, output signals on lines 10*a* and 14*a* to the $5 and $20 bill dispensers for dispensing in $5 and $20 bills, and in a minimum cycle time, a desired aggregate amount.

To select the particular matrix 24, 26, 28 or 30 in dependence upon the operability and currency supply in the $5, $10 and $20 bill dispensers 10, 12 and 14, the matrix selector 32 is provided. The matrix selector 32 is responsive to the control signals output on lines 10*b*, 12*b* and 14*b* from the operability/inventory monitor of the $5, $10 and $20 bill dispensers 10, 12 and 14. As noted previously, control signals are provided from the dispensers 10, 12 and 14 on lines 10*b*, 12*b* and 14*b* indicating the operability and currency supply of the respective dispensers. If the $5, $10 and $20 bill dispensers 10, 12 and 14 are all operational and have an existing currency supply control, signal inputs are provided to the matrix selector 32 on lines 10*b*, 12*b* and 14*b* reflecting the ready status of the dispensers. The matrix selector 32 in response to the presence of control inputs thereto on lines 10*b*, 12*b* and 14*b* provides an output signal on line 32*a*, enabling the $5-$10-$20 matrix 24, the other matrices 26, 28 and 30 being inhibited. With the matrix 24 enabled, an aggregate amount signal from the keyboard 18 on line 20 results in the production of output signals from the matrix 24 on lines 10*a*, 12*a* and 14*a* to the dispensers 10, 12 and 14 for dispensing the desired aggregate amount in a minimum cycle time. The matrix 24 effectively converts, or encodes, the aggregate amount signal on line 20 from the keyboard 18 to a plurality of concurrent different control signals on lines 10*a*, 12*a* and 14*a* to simultaneously actuate the $5, $10 and $20 bill dispensers, respectively, for dispensing the desired aggregate amount in a manner such that the resulting bill mix produces a minimum cycle time. The dispensers 10, 12 and 14 are designed to operate in parallel, i.e., simultaneously, with multiple bills dispensed from any given denomination dispenser being dispensed in series, i.e., sequentially.

In lieu of a matrix 24, an addressable storage medium could be provided in which the individual storage locations are addressed by the aggregate amount signal on line 20 from the keyboard 18 and contain the requisite control signals for actuating the dispensers 10, 12 and 14 to dispense, in a minimum cycle time, the desired amount entered into the keyboard 18.

Matrices 26, 28 and 30 operate in a manner similar to matrix 24, via lines 32*b*, 32*c* and 32*d* from the selector 32, except they become operative only when $20, $5 and $10 bills cannot be dispensed from the $20 bill dispenser 14, $5 bill dispenser 10 and $10 bill dispenser 12, respectively, due to inoperability and/or lack of currency in these respective dispensers.

In addition to using matrices or addressable memories for deriving, from the aggregate amount entered into the keyboard 18, the necessary dispenser control signals for dispensing the desired amount in a minimum cycle time from those dispensers 10, 12 and 14 which are operative and have currency, a specially programmed digital computer, minicomputer or microprocessor could be used. The computer or processor would be responsive to the aggregate amount signal on line 20 and the currency dispenser status signals on lines 10b, 12b and 14b, and would convert the aggregate amount into a bill mix designed to provide minimum cycle time, the derivation being in accordance with the mathematical procedure detailed hereafter.

(a) compute $\Sigma D_1, D_2, \ldots, D_n, \Sigma D_2, D_3, \ldots, D_n, \Sigma D_n$, where $D_1, D_2, \ldots, D_n$ are the values of the different denominations available for dispensing from said different denomination dispensers, with $D_1 > D_2 > \ldots > D_n$, $$\text{compute } N_1 = \frac{A_T}{\Sigma D_1, D_2, \ldots, D_n}, \quad \text{(b)}$$

where $A_T$ is the aggregate amount to be dispensed, and $N_1$ is the number to be dispensed of the largest denomination, $D_1$, available for dispensing, (c) compute the nearest integer, $N_1'$, to which $N_1$ can be rounded off, $N_1' = 0$ when $A_T < D_1$, (d) compute $A_1 = (N_1')(D_1)$, where $A_1$ is the amount to be dispensed using the largest denomination available, $D_1$, (e) compute $A^1 = A_T - A_1$, where $A^1$ is the amount of the aggregate amount, $A_T$, remaining after dispensing $N_1'$ denominations $D_1$, (f) repeat steps (b), (c), (d) and (e) for denominations $D_2, D_3, \ldots, D_n$ where $$N_2 = \frac{A^1}{\Sigma D_2, D_3, \ldots, D_n}, \ldots, N_n = \frac{A^{n-1}}{\Sigma D_n},$$

$$A_2 = (N_2')(D_2), \ldots, A_{n-1} = (N_{n-1}')(D_{n-1}), \text{ and}$$

$$A^2 = A^1 - A_2, \ldots, A^{n-1} = A^{n-2} - A_{n-1}$$

Having computed $N_1', N_2', \ldots, N_n'$, dispense amount $A_T$ using available denominations $D_1, D_2, \ldots D_n$ with a currency mix of $N_1'$ denominations $D_1$, $N_2'$ denominations $D_2, \ldots$, and $N_n$ denominations $D_n$.

By way of illustration, the foregoing generalized formula can be applied to dispense an aggregate amount $A_T = \$110$, when \$20s, \$10s and \$5s are available, as follows:

Compute:
$\Sigma D_1 = \Sigma D_1, D_2, \ldots, D_n$,
Example:
Where have \$20s, \$10s and \$5s available, $n=3$ and $D_1 = \$20, D_2 = \$10$ and $D_3 = \$5$
$\Sigma D_1 = \Sigma 20, 10, 5 = \$35$
[If had \$50s, \$20s, \$10s and \$5s available, $n=4$ and $D_1 = \$50, D_2 = \$20, D_3 = \$10$ and $D_4 = \$5$.
$\Sigma D_1 = \Sigma 50, 20, 10, 5 = \$85$
Similarly, if had \$50s, \$10s and \$5s available, $n=3$ and $D_1 = \$50, D_2 = \$10$ and $D_3 = \$5$,
$\Sigma D_1 = \Sigma 50, 10, 5 = \$65$]
Compute:
$\Sigma D_2 = \Sigma D_2, D_3, \ldots, D_n$
Example:
Where have \$20s, \$10s and \$5s available, $\Sigma D_2 = \Sigma 10, 5 = \$15$
[If had \$50s, \$20s, \$10s and \$5s available, $\Sigma D_2 = \Sigma 20, 10, 5 = \$35$.
Similarly, if had \$50s, \$10s and \$5s available, $\Sigma D_2 = \Sigma 10, 5 = \$15$]
Compute:
$\Sigma D_3 = \Sigma D_3, \ldots, D_n$
Example:
Where have \$20s, \$10s and \$5s available, $\Sigma D_3 = \Sigma 5 = \$5$
[If had \$50s, \$20s, \$10s and \$5s available, $\Sigma D_3 = \Sigma 10, 5 = \$15$
Similarly, if had \$50s, \$10s and \$5s available, $\Sigma D_3 = \Sigma 5 = \$5$]
Compute:
$\Sigma D_4 = \Sigma D_4, \ldots, D_n$
Example:
Where have \$20s, \$10s and \$5s available, $\Sigma D_4 = 0$
[If had \$50s, \$20s, \$10s and \$5s available, $\Sigma D_4 = \Sigma 5 = \$5$
Similarly, if had \$50s, \$10s and \$5s available, $\Sigma D_4 = 0$]
When have n denominations available, compute $\Sigma D_1, \Sigma D_2, \Sigma D_3, \ldots \Sigma D_n$, where $\Sigma D_n = D_n$.
Compute:
$N_1$ = number to be dispensed of largest denomination, $D_1$, available
$N_1 = A_T/\Sigma D_1$, where $A_T$ = amount to be dispensed
Example:
$A_T = \$110$ and have \$20s, \$10s and \$5s available
$N_1 = A_T/\Sigma D_1 = 110/35 = 3.143$
When $N_1$ is not an integer, round to nearest integer
Example:
$N_1 = 3.143 \rightarrow N_1' = 3$
[$N_1 = 3.50 \rightarrow N_1' = 4$
$N_1 = 3.80 \rightarrow N_1' = 4$]
(where $A_T$ is less than largest denomination available, $N_1 = 0$).
Compute:
$A_1$ = amount to be dispensed using largest denomination available
$A_1 = (N_1')$ (dollar value of largest denomination, $D_1$, available)
Example:
where $A_T = \$110$ and have \$20s, \$10s and \$5s available
$A_1 = (3)(\$20) = \$60$
Compute:
$A^1$ = amount remaining to be dispensed after dispensing denomination $D_1$
$A^1 = A_T - A_1 = \$110 - \$60 = \$50$
Compute:
$N_2$ = number of be dispensed of second largest denomination, $D_2$, available
$N_2 = A^1/\Sigma D_2$
Example:
$A_T = \$110$ and have \$20s, \$10s and \$5s available
$N_2 = A/\Sigma D_2 = \$50/\$15 = 3.333$
Round $N_2$ to nearest integer as above $N_2' = 3.0$
Compute:
$A_2$ = amount to be dispensed using second largest denomination, $D_2$, available
$A_2 = (N_2')$ (dollar value of second largest denomination, $D_2$, available)
Example:
where $A_T = \$110$ and have \$20s, \$10s and \$5s available,
$A_2 = (3)(\$10) = \$30$
Compute:
$A^2$ = amount remaining to be dispensed after dispensing denominations $D_1$ and $D_2$ $A^2 = A_1 - A_2$ Example:
  where $A_T = \$110$ and have $20s, $10s and $5s available,
  $A^2 = \$50 - \$30 = \$20$ Compute:
  $N_3$ = number to be dispensed of third largest denomination, $D_3$, available
  $N_3 = A^2/\Sigma D_3$ Example:
  $A_T = \$110$ and have $20s, $10s and $5s available
  $N_3 = \$20/\$5 = 4$ Summary Where amount to be dispensed, $A_T$, is $110, and have $20s, $10s and $5s available to dispense, dispense 3—$20s, 3—$10s 4—$5s.

The following chart indicates, to achieve minimal cycle time, the number of bills of each denomination to be dispensed for varying aggregate amounts when dispensers 10, 12 14 are operational and have currency:

| Amount to be Dispensed | Number of Each Denomination | | |
|---|---|---|---|
| | $20s | $10s | $5s |
| $5 | | | 1 |
| 10 | | 1 | |
| 15 | | 1 | 1 |
| 20 | 1 | | |
| 25 | 1 | | 1 |
| 30 | 1 | 1 | |
| 35 | 1 | 1 | 1 |
| 40 | 1 | 1 | 2 |
| 45 | 1 | 2 | 1 |
| 50 | 1 | 2 | 2 |
| 55 | 2 | 1 | 1 |
| 60 | 2 | 1 | 2 |
| 65 | 2 | 2 | 1 |
| 70 | 2 | 2 | 2 |
| 75 | 2 | 2 | 3 |
| 80 | 2 | 3 | 2 |
| 85 | 2 | 3 | 3 |
| 90 | 3 | 2 | 2 |
| 95 | 3 | 2 | 3 |
| 100 | 3 | 3 | 2 |
| 105 | 3 | 3 | 3 |
| 110 | 3 | 3 | 4 |
| 115 | 3 | 4 | 3 |

The following chart indicates, to achieve minimal cycle time, the number of bills of each denomination to be dispensed for varying desired aggregate amounts when $5, $10, $20 and $50 bill dispensers are provided and all are operational and have currency available for dispensing.

| Amount to be Dispensed | Number of Each Denomination | | | |
|---|---|---|---|---|
| | $50s | $20s | $10s | $5s |
| $5 | | | | 1 |
| 10 | | | 1 | |
| 15 | | | 1 | 1 |
| 20 | | 1 | | |
| 25 | | 1 | | 1 |
| 30 | | 1 | 1 | |
| 35 | | 1 | 1 | 1 |
| 40 | | 1 | 1 | 2 |
| 45 | | 1 | 2 | 1 |
| 50 | 1 | | 2 | 2 |
| 55 | | 2 | 1 | 1 |
| 60 | | 2 | 1 | 2 |
| 65 | | 2 | 2 | 1 |
| 70 | | 2 | 2 | 2 |
| 75 | | 2 | 2 | 3 |
| 80 | | 2 | 3 | 2 |
| 85 | | 2 | 3 | 3 |
| 90 | | 3 | 2 | 2 |
| 95 | | 3 | 2 | 3 |
| 100 | | 3 | 3 | 2 |
| 105 | | 3 | 3 | 3 |
| 110 | | 3 | 3 | 4 |
| 115 | | 3 | 4 | 3 |
| 120 | 1 | 2 | 2 | 2 |
| 125 | 1 | 2 | 2 | 3 |
| 130 | 2 | 1 | 1 | |
| 135 | 2 | 1 | 1 | 1 |
| 140 | 2 | 1 | 1 | 2 |
| 145 | 2 | 1 | 2 | 1 |
| 150 | 2 | 1 | 2 | 2 |
| 155 | 2 | 2 | 1 | 1 |
| 160 | 2 | 2 | 1 | 2 |
| 165 | 2 | 2 | 2 | 1 |
| 170 | 2 | 2 | 2 | 2 |
| 175 | 2 | 2 | 2 | 3 |
| 180 | 2 | 2 | 3 | 2 |
| 185 | 2 | 2 | 3 | 3 |
| 190 | 2 | 3 | 2 | 2 |
| 195 | 2 | 3 | 2 | 3 |
| 200 | 2 | 3 | 3 | 2 |
| 205 | 2 | 3 | 3 | 3 |
| 210 | 2 | 3 | 3 | 4 |
| 215 | 3 | 2 | 2 | 1 |
| 220 | 3 | 2 | 2 | 2 |
| 225 | 3 | 2 | 2 | 3 |
| 230 | 3 | 2 | 3 | 2 |
| 235 | 3 | 2 | 3 | 3 |
| 240 | 3 | 3 | 2 | 2 |
| 245 | 3 | 3 | 2 | 3 |
| 250 | 3 | 3 | 3 | 2 |
| 255 | 3 | 3 | 3 | 3 |
| 260 | 3 | 3 | 3 | 4 |
| 265 | 3 | 3 | 4 | 3 |
| 270 | 3 | 3 | 4 | 4 |
| 275 | 3 | 4 | 3 | 3 |
| 280 | 3 | 4 | 3 | 4 |
| 285 | 3 | 4 | 4 | 3 |
| 290 | 3 | 4 | 4 | 4 |
| 295 | 3 | 4 | 4 | 5 |
| 300 | 4 | 3 | 3 | 2 |
| 305 | 4 | 3 | 3 | 3 |
| 310 | 4 | 3 | 3 | 4 |
| 315 | 4 | 3 | 4 | 3 |
| 320 | 4 | 3 | 4 | 4 |
| 325 | 4 | 4 | 3 | 3 |
| 330 | 4 | 4 | 3 | 4 |
| 335 | 4 | 4 | 4 | 3 |
| 340 | 4 | 4 | 4 | 4 |

The following chart indicates, to achieve minimal cycle time, the number of bills of each denomination to be dispensed for varying desired aggregate amounts when there are only $20 and $5 bills available for dispensing.

| Amount to be Dispensed | Number of Each Denomination | | |
|---|---|---|---|
| | $20s | $10s | $5s |
| $5 | | | 1 |
| 10 | | | 2 |
| 15 | | | 3 |
| 20 | 1 | | |
| 25 | 1 | | 1 |
| 30 | 1 | | 2 |
| 35 | 1 | | 3 |
| 40 | 2 | | |
| 45 | 2 | | 1 |
| 50 | 2 | | 2 |
| 55 | 2 | | 3 |
| 60 | 2 | | 4 |
| 65 | 3 | | 1 |
| 70 | 3 | | 2 |
| 75 | 3 | | 3 |
| 80 | 3 | | 4 |

-continued

| Amount to be Dispensed | Number of Each Denomination | |
|---|---|---|
| 85 | 3 | 5 |
| 90 | 4 | 2 |
| 95 | 4 | 3 |
| 100 | 4 | 4 |
| 105 | 4 | 5 |
| 110 | 4 | 6 |
| 115 | 5 | 3 |
| 120 | 5 | 4 |
| 125 | 5 | 5 |
| 130 | 5 | 6 |
| 135 | 5 | 7 |
| 140 | 6 | 4 |
| 145 | 6 | 5 |
| 150 | 6 | 6 |
| 155 | 6 | 7 |
| 160 | 6 | 8 |
| 165 | 7 | 5 |

From the foregoing charts it is clear that to dispense a desired aggregate amount from simultaneously operable different denomination dispensers in a minimum overall cycle time, the bill mix must be such that, to the extent possible depending on the amount desired and the denominaions available, equal quantities of each available denomination are dispensed each time an aggregate amount entry is made in the keyboard. Thus, if $140 is requested and $20, $10 and $5 bills are available, minimization of overall cycle time is achieved by operating the $20, $10 and $5 dispensers such that all dispensers simultaneously issue four bills in sequence, that is, the $20, $10 and $5 bill dispensers simultaneously issue four $20s, four $10s and four $5s, respectively, with the four bills from each dispenser being issued sequentially. In this way the $140 aggregate amount is dispensed in the time it takes any one of the dispensers to dispense four bills in succession. This is in contrast to the "minimum bill" approach, which, for a $140 aggregate amount, would dispense seven $20 bills in sequence, consuming an amount of time equivalent to what it would take to dispense seven bills in succession from any given dispenser.

From the foregoing charts it is also clear that, on the average, and assuming a uniform distribution of aggregate amounts requested, simultaneous operation of the dispensers to dispense a desired aggregate amount with a minimum of cycle time results in equalization of the utilization of the different denomination currency dispensers. This, in turn, equalizes wear of the different denomination dispensers, avoiding premature breakdown of the more frequently utilized dispenser, which results when the dispensers are not used equally as is the case when bills are dispensed in accordance with a "minimum bill" mix approach. In addition, equalization of the utilization of the different denomination cash dispensers avoids premature depletion of the currency supply in the more frequently utilized cash dispenser, which results when they are unequally utilized as is the case when a "minimum bill mix" approach is utilized.

Finally, by reason of utilizing a "minimum cycle time" approach for dispensing bills, and as is apparent from the foregoing charts, a customer is generally provided with bills of each of the different denominations. For example, a customer desiring $140 gets four $20 bills, four $10 bills and four $5 bills. This is in contrast to seven $20 bills when the minimum bill approach is used.

What is claimed is:

1. A cash dispensing system comprising:
   a plurality of different cash dispensers each having provision for an inventory of currency of a different denomination, each said different denomination dispenser being operative independently of the others to dispense currency of its respective denomination in response to dispenser control signals input thereto,
   a keyboard for entering a single amount of money representing an aggregate amount to be collectively dispensed in a mix of different denominations from said different denomination cash dispensers, said keyboard providing electrical signals on an output thereof representing said aggregate amount entered therein,
   a control circuit responsive to said aggregate amount signals for simultaneously providing separate dispenser control signals to said plurality of different denomination dispensers for simultaneously actuating said different denomination dispensers to dispense, in a minimum amount of time, said aggregate amount entered into said keyboard, regardless of the value thereof, with a currency denomination mix which includes, to the extent possible considering the aggregate amount and the denominations available, substantially equal quantities of each denomination.

2. The cash dispensing system of claim 1 wherein said different cash dispensers each include a monitor providing a dispenser status output signal reflecting the availability for dispensing of currency of its respectively associated different denomination,
   and wherein said control circuit is responsive to said different dispenser status output signals for dispensing said aggregate amount in a minimum amount of time using currency of available denominations with a mix of available denominations which includes, to the extent possible considering the aggregate amount and the denominations available, substantially equal quantities of each available denomination.

3. The cash dispensing system of claim 1 wherein said control circuit includes:
   selectively addressable memories each storing a different combination of said separate dispenser control signals correlated to a different aggregate amount for simultaneously operating said different denomination dispensers to dispense a different aggregate amount in a minimum amount of time with a currency denomination mix which includes, to the extent possible considering the aggregate amount and the denominations, substantially equal quantities of each denomination, said memories being addressable in response to said aggregate amount signals.

4. A cash dispenser system comprising:
   a plurality of different cash dispensers each having provision for an inventory of currency of a different denomination, each said different denomination dispenser being operative independently of the others to dispense currency of its respective denomination in response to dispenser control signals input thereto,
   a keyboard for entering a single amount of money representing an aggregate amount to be collectively dispensed in a mix of different denominations from said different denomination cash dispensers, said keyboard providing electrical signals on an output thereof representing said aggregate amount entered therein, a control circuit responsive to said aggregate amount signals for simultaneously providing separate dispenser control signals to said plurality of different denomination dispensers for simultaneously actuating said different denomination dispensers to dispense in a minimum amount of time said aggregate amount entered into said keyboard with a currency denomination mix which includes, to the extend possible considering the aggregate amount and the denominations, substantially equal quantities of each denomination, said control circuit including:

(a) means for computing $\Sigma D_1, D_2, \ldots, D_n, \Sigma D_2, D_3, \ldots, D_n, \Sigma D_n$, where $D_1, D_2, \ldots D_n$ are the values of the different denominations available for dispensing from said different denomination dispensers, with $D_1 > D_2 > \ldots > D_n$, $$\text{means for computing } N_1 = \frac{A_T}{\Sigma D_1, D_2, \ldots, D_n} \quad \text{(b)}$$

$$N_2 = \frac{A^1}{\Sigma D_2, D_3, \ldots, D_n}, \ldots, N_n = \frac{A^{n-1}}{\Sigma D_n},$$

where $A_T$ is the aggregate amount to be dispensed and $N_1, N_2, \ldots N_n$ are the numbers to be dispensed of the different denominations $D_1, D_2, \ldots D_n$, respectively, (c) means for rounding off $N_1, N_2, \ldots N_n$, to the nearest integer, $N_1', N_2', \ldots N_n'$, except where $A_T < D_1$ in which case $N_1' = 0$, (d) means for computing $A_1 = (N_1')(D_1)$, $A_2 = (N_2')(D_2), \ldots, A_{n-1} = (N_{n-1}')(D_{n-1})$, where $A_1, A_2, \ldots A_{n-1}$ are the amounts to be dispensed using denominations $D_1, D_2, \ldots D_{n-1}$, (e) means for computing $A^1 = A_T - A_1$, $A^2 = A^1 - A_2$, $\ldots, A^{n-1} = A^{n-2} - A_{n-1}$, where $A^1, A^2, \ldots A^{n-1}$ are the amounts of the aggregate amount $A_T$ remaining after dispensing $N_1', N_2', \ldots N_{n-1}'$ denominations $D_1, D_2, \ldots D_{n-1}$, respectively, and (f) means for simultaneously activating said different denomination dispensers to simultaneously dispense $N_1', N_2', \ldots N_n'$, denominations $D_1, D_2, \ldots D_n$, thereby dispensing said aggregate amount in a minimum amount of time with a currency denomination mix which includes, to the extent possible considering the amount and denominations available, substantially equal quantities of each denomination.

5. A method for dispensing a plurality of different aggregate amounts of currency by means of a plurality of separate different denomination currency dispensers, including the steps of:

manually entering into a keyboard sequentially the plurality of different aggregate amounts of currency requested by users, sequentially generating electrical signals representative of the sequentially requested aggregate amounts of currency entered into the keyboard, sequentially converting the sequentially generated aggregate amount signals to a plurality of dispenser control signals, which dispenser control signals when input to different ones of the dispensers will simultaneously actuate the different dispensers to dispense the sequentially requested aggregate amounts of currency, each sequentially dispensed currency denomination mix corresponding to a sequentially requested aggregate amount of currency including, to the extent possible considering the requested aggregate amount of currency and the different denominations, substantially equal quantities of each denomination, and sequentially providing the plurality of dispenser control signals to different ones of the dispensers for sequentially dispensing the sequentially requested aggregate amounts of currency collectively from the different dispensers in response to the plurality of dispenser control signals, each sequentially dispensed currency denomination mix corresponding to a sequentially requested aggregate amount of currency including, to the extent possible considering the requested aggregate amount of currency and the different denominations, substantially equal quantities of each denomination for providing the users with varied mixes of denominations for all requested aggregate amounts of currency, minimizing the time required for dispensing all requested aggregate amounts of currency, equalizing wear on the dispensers and depleting the inventories of the different denominations at approximately the same rate in order to avoid premature depletion of one denomination relative to other denominations.

6. The method of claim 5 wherein the converting step includes accessing an addressable memory having multiple storage locations using the requested aggregate amounts as the addresses to obtain the dispenser control signals from storage locations having addresses correlated with the requested aggregate amounts, the multiple storage locations each having a different address and storing different combinations of the dispenser control signals corresponding to different aggregate amounts associated with each different memory location address.

7. The method of claim 5 wherein the converting step includes:

(a) computing $\Sigma D_1, D_2, \ldots, D_n, \Sigma D_2, D_3, \ldots, D_n, \Sigma D_n$, where $D_1, D_2, \ldots D_n$ are the values of the different denominations available for dispensing from said different denomination dispensers, with $D_1 > D_2 > \ldots > D_n$, $$\text{computing } N_1 = \frac{A_T}{\Sigma D_1, D_2, \ldots, D_n}, \quad \text{(b)}$$

where $A_T$ is the aggregate amount to be dispensed and $N_1$ is the number to be dispensed of the largest denomination, $D_1$, available for dispensing, (c) computing the nearest integer, $N_1'$, to which $N_1$ can be rounded off, $N_1' = 0$ when $A_T < D_1$, (d) computing $A_1 = (N_1')(D_1)$, where $A_1$ is the amount to be dispensed using the largest denomination available, $D_1$, (e) computing $A^1 = A_T - A_1$, where $A^1$ is the amount of the aggregate amount, $A_T$, remaining after dispensing $N_1'$ denominations $D_1$, and (f) repeating steps (b), (c), (d), and (e) for denominations $D_2, D_3, \ldots D_n$, where $$N_2 = \frac{A^1}{\Sigma D_2, D_3, \ldots, D_n}, \ldots, N_n = \frac{A^{n-1}}{\Sigma D_n},$$

$$A_2 = (N_2')(D_2), \ldots, A_{n-1} = (N_{n-1}')(D_{n-1}) \text{ and}$$

$$A^2 = A^1 - A_2, \ldots, A^{n-1} = A^{n-2} - A_{n-1}.$$

* * * * *